United States Patent
Neilson et al.

(10) Patent No.: US 9,568,223 B2
(45) Date of Patent: Feb. 14, 2017

(54) MAGNETOCALORIC MATERIALS FOR CRYOGENIC LIQUIFICATION

(71) Applicant: The Johns Hopkins University, Baltimore, MD (US)

(72) Inventors: James R. Neilson, Baltimore, MD (US); Tyrel M. McQueen, Baltimore, MD (US)

(73) Assignee: THE JOHNS HOPKINS UNIVERSITY, Baltimore, MD (US)

( * ) Notice: Subject to any disclaimer, the term of this patent is extended or adjusted under 35 U.S.C. 154(b) by 343 days.

(21) Appl. No.: 14/063,903

(22) Filed: Oct. 25, 2013

(65) Prior Publication Data

US 2015/0114007 A1  Apr. 30, 2015

(51) Int. Cl.
  *F25B 21/00* (2006.01)
  *H01F 1/01* (2006.01)

(52) U.S. Cl.
  CPC ........... *F25B 21/00* (2013.01); *H01F 1/012* (2013.01); *F25B 2321/002* (2013.01); *Y02B 30/66* (2013.01)

(58) Field of Classification Search
  CPC ...... H01F 1/00; H01F 1/012; F25B 2321/002; F25B 21/00; Y02B 30/66
  USPC .................. 62/3.1; 252/62.51 R, 67
  See application file for complete search history.

(56) References Cited

U.S. PATENT DOCUMENTS

| | | | |
|---|---|---|---|
| 4,956,976 A | 9/1990 | Kral et al. | |
| 5,462,610 A | 10/1995 | Gschneidner, Jr. et al. | |
| 5,743,095 A | 4/1998 | Gschneidner, Jr. et al. | |
| 6,589,366 B1 | 7/2003 | Gschneidner, Jr. et al. | |
| 7,076,959 B2 | 7/2006 | Lewis et al. | |
| 7,114,340 B2 | 10/2006 | Pecharsky et al. | |
| 7,549,296 B2 | 6/2009 | Gschneidner, Jr. et al. | |
| 7,578,892 B2 | 8/2009 | Hirosawa et al. | |
| 7,695,574 B2 | 4/2010 | Nakajima | |
| 7,914,628 B2 | 3/2011 | Tsuji et al. | |
| 2002/0040583 A1 | 4/2002 | Barclay et al. | |
| 2004/0261420 A1 | 12/2004 | Lewis | |
| 2009/0151363 A1 | 6/2009 | Sari et al. | |
| 2010/0071383 A1 | 3/2010 | Zhang et al. | |

(Continued)

FOREIGN PATENT DOCUMENTS

WO   01/33145   5/2001

OTHER PUBLICATIONS

Hautier, G. et al. (From the computer to the laboratory: materials discovery and design using first-principles calculations. J. Mater. Sci. 47, 7317-7340 (2012).).*

(Continued)

*Primary Examiner* — Len Tran
*Assistant Examiner* — Ana Vazquez
(74) *Attorney, Agent, or Firm* — MH2 Technology Law Group LLP

(57) ABSTRACT

System and methods for cryogenic magnetocaloric refrigeration are provided. The system may include a magnetocaloric material including a single ion anisotropy and primary magnetic interactions of at most two dimensions. The system may also include a cryogenic fluid in communication with the magnetocaloric material, such that, when a magnetic field having a strength of at least a predetermined threshold is applied, the magnetocaloric material is configured to at least partially liquefy the cryogenic fluid.

14 Claims, 4 Drawing Sheets

(56) References Cited

U.S. PATENT DOCUMENTS

2012/0222428 A1* 9/2012 Celik ................. F25B 21/00
62/3.1

OTHER PUBLICATIONS

Jian Liu et al., "Giant Magnetocaloric Effect Driven by Structural Transitions", Nature Materials, 11, 2012, pp. 620-626.
Oliver Gutfleisch et al, "Magnetic Materials and Devices for the 21st Century: Stronger, Lighter, and More Energy Efficient", Advanced Materials, 23, 2011, pp. 812-842.
Ajaya K. Nayak et al., "Kinetic Arrest Related to a First-Order Ferrimagnetic to Antiferromagnetic Transition in the Heusler Compound Mn2PtGa", J. Appl. Phys., 113, 17E308, 2013.
International Search Report dated Feb. 16, 2015 from International Application No. PCT/US2014/062269, pp. 1-10.

* cited by examiner

MAGNETOCALORIC MATERIALS FOR CRYOGENIC LIQUIFICATION

BACKGROUND

Magnetocaloric refrigeration is a process in which the entropy of a magnetocaloric material is modulated by a magnetic field, such that the material acts as a refrigerant, pumping heat from a lower-temperature source to a higher-temperature sink. Magnetocaloric refrigeration processes typically fall into either a near-room-temperature category or a cryogenic category, with the intended application resulting in different magnetocaloric materials and/or system configurations being used.

In some applications requiring cryogenic refrigeration, traditional methods of cryogenic refrigeration are unsuitable. For example, certain medical (e.g., MRI) and other small-scale applications employ liquefied helium or other cryogens, which have very low boiling points, for example, 4K for helium. Industrial compressors and other equipment designed to liquefy helium in conventional mechanical cycles may be efficient to liquefy large quantities of cryogens, but inefficient at smaller volume design points. Further, such industrial machinery may be prohibitively expensive for these applications. However, suitable magnetocaloric materials for such cryogenic applications may not be readily available. Accordingly, such cryogenic consumers typically purchase helium liquefied by a third party, use it, and then allow the gaseous helium to re-enter the environment. However, such methods require continual helium purchase, while the accessible supply thereof may be limited and prices subject to fluctuation.

What is needed, then, are systems and methods to economically liquefy and/or re-liquefy a cryogen such as helium.

SUMMARY

Embodiments of the disclosure may provide a system for cryogenic magnetocaloric refrigeration. The system may include a magnetocaloric material including a single ion anisotropy and primary magnetic interactions of at most two dimensions. The system may also include a cryogenic fluid in communication with the magnetocaloric material, such that, when a magnetic field having a strength of at least a predetermined threshold is applied, the magnetocaloric material is configured to at least partially liquefy the cryogenic fluid.

Embodiments of the disclosure may also provide a method of magnetocaloric cryogenic refrigeration. The method may include applying a magnetic field to a magnetocaloric material. Applying the magnetic field causes the magnetocaloric material undergo a magnetic phase transition at a temperature less than or equal to a boiling temperature of a cryogenic fluid. Further, the magnetocaloric material has a single ion anistropy and a magnetic structure of at most two dimensions. The method may also include removing heat from the magnetocaloric material while applying the magnetic field, and causing the cryogenic fluid, in a substantially gaseous phase, to come into thermal contact with the magnetocaloric material. The method may further include decreasing a strength of the magnetic field applied to the magnetocaloric material, such that the magnetocaloric material undergoes a reverse of the magnetic phase transition and absorbs heat from the cryogenic fluid in the substantially gaseous phase, so as to transition the cryogenic fluid to a substantially liquid phase. The method may additionally include causing the cryogenic fluid in the substantially liquid phase to move away from the magnetocaloric material.

Embodiments of the disclosure may further provide a magnetocaloric refrigeration system. The system may include a magnetocaloric material that includes boron, lithium, and a transition metal, the transition metal being selected from a group consisting of Fe in a trigonal bypyramid crystal field, Co in an octrahedral crystal field, and Mn. The system may also include a magnet configured to provide a magnetic field having a strength of between about 5 Tesla and about 10 Tesla. The system may further include a cryogenic fluid in communication with the magnetocaloric material, such that, when the magnetic field is applied and then removed from the magnetocaloric material, the magnetocaloric material is configured to at least partially liquefy the cryogenic fluid.

It is to be understood that both the foregoing general description and the following detailed description are exemplary and explanatory only and are not restrictive of the present teachings, as claimed.

BRIEF DESCRIPTION OF THE DRAWINGS

The accompanying drawing, which is incorporated in and constitutes a part of this specification, illustrates an embodiment of the present teachings and together with the description, serves to explain the principles of the present teachings. In the figures.

Figure 1:
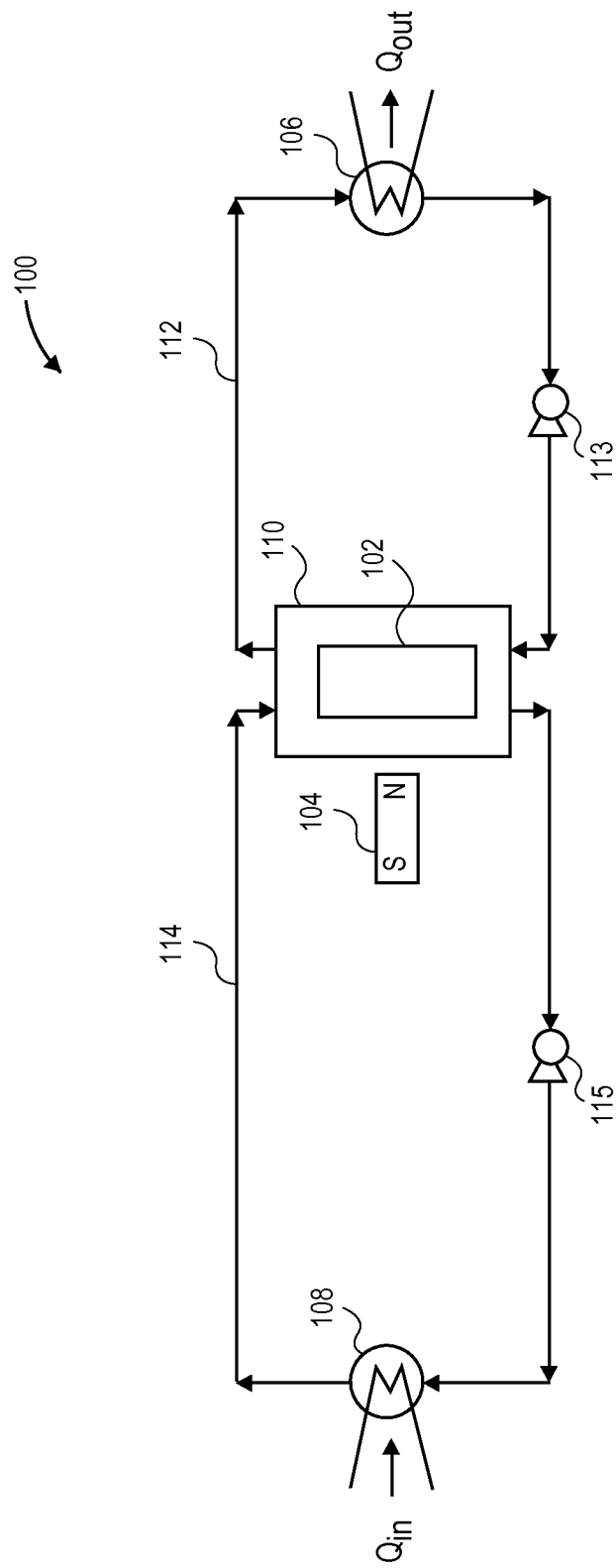
FIG. 1 illustrates a schematic view of a cryogenic, magnetocaloric cooling system employing a magnetocaloric material of the present disclosure, according to an embodiment.

It should be noted that some details of the figure have been simplified and are drawn to facilitate understanding of the embodiments rather than to maintain strict structural accuracy, detail, and scale.

DETAILED DESCRIPTION

Reference will now be made in detail to embodiments of the present teachings, examples of which are illustrated in the accompanying drawing. In the drawings, like reference numerals have been used throughout to designate identical elements, where convenient. In the following description, reference is made to the accompanying drawing that forms a part thereof, and in which is shown by way of illustration a specific exemplary embodiment in which the present teachings may be practiced. The following description is, therefore, merely exemplary.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

FIG. 1 illustrates a simplified schematic view of a cryogenic, magnetocaloric refrigeration system 100, according to an embodiment. Although a simplified system 100 is depicted, one of ordinary skill in the art will recognize that many similar systems, employing varying configurations of components suitable for a variety of applications may be employed, without departing from the scope of the present disclosure. Further, any one or a combination of two or more thermodynamic cycles may be employed, including the Carnot, Ericsson, and Stirling cycles, and, further, that the system 100 may employ active magnetic regenerators (AMR). Thus, it will be appreciated that the present system 100 shown and described is merely one illustrative example among many contemplated, in which one or more magnetocaloric materials may be employed to liquefy a particular cryogenic fluid, such as, for example, helium at a temperature of about 4K.

The system 100 generally includes a magnetocaloric material 102, a magnet 104, and two heat exchangers, specifically, a hot-side heat exchanger 106 and a cold-side heat exchanger 108. Depending, for example, on the application and/or cycle(s) chosen, the system 100 may include multiple magnetocaloric materials 102 and/or multiple magnets 104, either or both of which may move relative to the other. Such systems with multiple and/or movable materials 102/magnets 104 may provide increased efficiency through magnetic regeneration; however, for the sake of simplicity in describing the concepts herein, a single magnet 104 and magnetocaloric material 102 embodiment is described, without limitation.

The cold-side heat exchanger 108 may be configured to absorb heat $Q_{in}$ from an environment, another fluid stream, etc., such as, for example, to support MRI, semiconductor, or other cryogenic cooling applications. The hot-side heat exchanger 106 may reject heat $Q_{out}$ into a heat sink, such as the environment, another magnetocaloric material, a secondary flow of fluid such as refrigerant for another thermodynamic cycle (e.g., nitrogen), or the like.

The magnetocaloric material 102 may be disposed in a tank, dish, and/or another other kind of vessel 110 and may be provided as a trough, wafer, or any other suitable construction. The vessel 110 may be insulated, such that heat transfer between the magnetocaloric material 102 and fluids within the vessel 110 are or are substantially adiabatic. Further, the magnetocaloric material 102 may be disposed in proximity to or otherwise in communication with the magnet 104, such that the magnet 104 is able to apply a magnetic field thereto. In some cases, the magnet 104 may be disposed within the vessel 110 or the vessel 110 and/or the magnetocaloric material 102 may be disposed between two magnets 104.

The system 100 may include conduits 112 and 114. The conduit 114 may form a fluid circuit for the cold side of the system 100, for example, conveying a cold refrigerant between the cold-side heat exchanger 108 and the vessel 110. Similarly, the conduit 112 may form a fluid circuit for the hot side of the system 100, for example, conveying a hot refrigerant fluid between the hot-side heat exchanger 106 and the vessel 110. Although shown as a closed fluid circuit, in some cases, the system 100 may form an open fluid circuit, e.g., on the cold side. For example, the liquefied cold refrigerant may be expelled from the system 100 instead of or in addition to coursing through the cold-side heat exchanger 108, e.g., so as to support cooling operations, etc.

Further, it will be appreciated that the conduits 112, 114 may intersect or include any variety of fluid control components, such as valves, reducing or expanding elements and/or the like, for example, to support AMR systems, any suitable thermodynamic cycle, or the like. Two such fluid control components are shown, without limitation, as pumps 113, 115.

In at least one embodiment, the fluid control components may be configured to alternate flow to the vessel 110 between the hot and cold sides based on the stage of the system 100, specifically, the magnetocaloric material, as will be described in greater detail below. In some embodiments, the cold refrigerant may be a cryogenic fluid such as, for example, helium or hydrogen.

The magnet 104 may be configured to apply the magnetic field on the magnetocaloric material 102 selectively. For example, the magnet 104 may be an electromagnet and may apply, remove, increase, decrease, etc. the magnetic field according to current supplied to the magnet 104. In other embodiments, the magnet 104 may be a permanent magnet, which may be moved, shielded, or otherwise adjusted, so as to modulate that magnetic field strength applied to the material 102. In various embodiments, the strength of the magnetic field may be selected to provide maximum efficiency in the magnetocaloric material 102 pump a desired amount of heat from the cold refrigerant to the hot refrigerant (or the environment, etc.) at a desired temperature. Thus, the magnetic field strength may be selected to provide a predetermined temperature lift in view of a desired flow rate for the cold refrigerant. In other embodiments, a predetermined magnetic field strength may be applied and the flow rate of the cold refrigerant adjusted to meet the heat pumping potential of the magnetocaloric material 102. In various embodiments, the magnetic field strength applied by the magnet 104 may be between about 5 Tesla and about 9 Tesla, between about 6 Tesla and about 8 Tesla, or about 7 Tesla.

Materials suitable for use in the magnetocaloric material 102 may exhibit strong single ion spin anisotropy and have a maximum magnetocaloric effect, e.g., first-order magnetic phase transition, at the boiling temperature of the cold refrigerated fluid. A "strong" single ion spin anisotropy may be defined as at least about 10% of the primary magnetic exchange energy. In an embodiment, the cold refrigerant fluid may be helium, which has a boiling temperature of about 4K, and thus the maximum magnetocaloric effect of the material of the magnetocaloric material 102 may be at a similar temperature (e.g., within about 20% of the boiling temperature).

Such materials may have a low dimensional (e.g., one or two dimensions) primary magnetic interactions. Further, suitable magnetocaloric materials may include a non-magnetic, main-group element, such as boron. Such magnetocaloric materials may also include a transition metal such as Fe(II) in a trigonal bipyramid crystal filed, with D3h point symmetry or the other, similar structures. Further, the transition metal may include Co(II) in an octahedral crystal field, or a similar structure thereto. Other embodiments may include any ion with an unquenched orbital moment. Further, in some embodiments, manganese may be employed as the transition metal. The magnetocaloric material may also include an alkali metal, e.g., lithium. One specific example of a suitable material is $LiFeBO_3$. Another specific example is $LiCoBO_3$. Yet another specific example is $LiMnBO_3$. These three compounds do not, however, represent an exhaustive list, and other compounds may provide suitable magnetocaloric materials, consistent with aspects of the present disclosure.

Figure 2A:
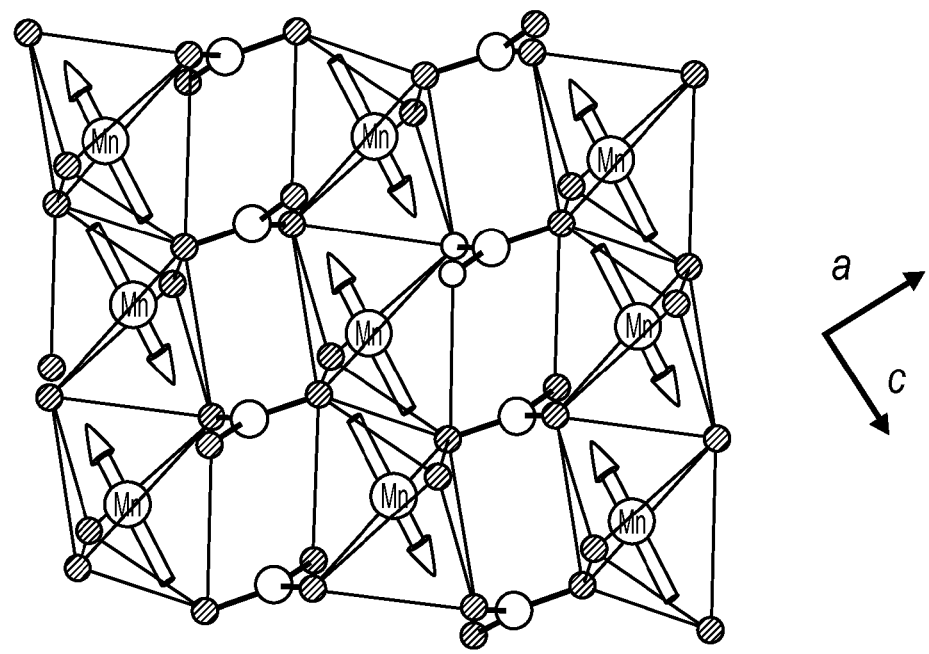
FIGS. 2A-2C illustrate lattice structures of three specific examples of magnetocaloric materials, according to an embodiment.
Figure 2B:
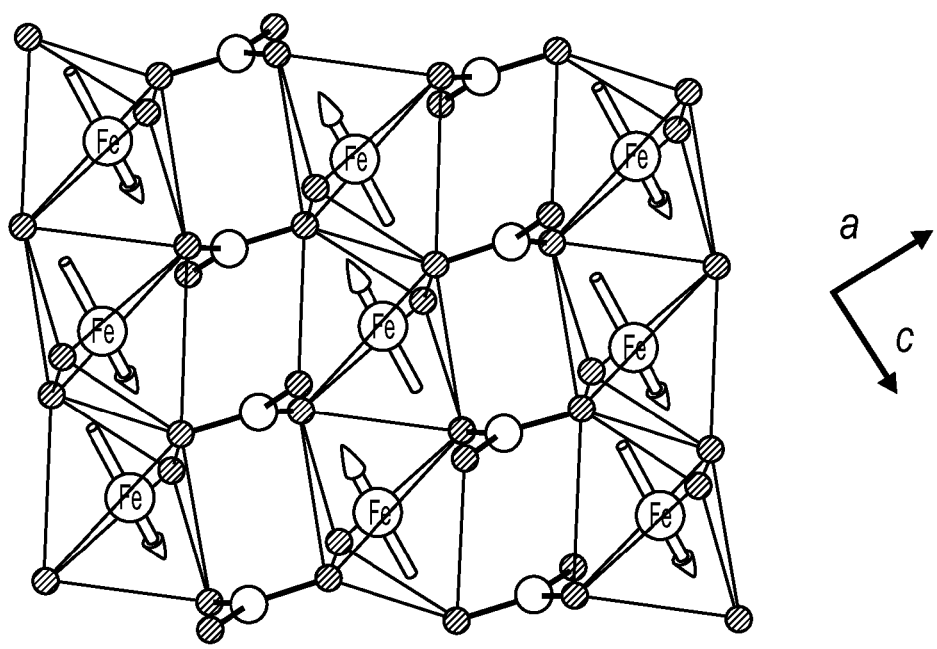
Figure 2C:
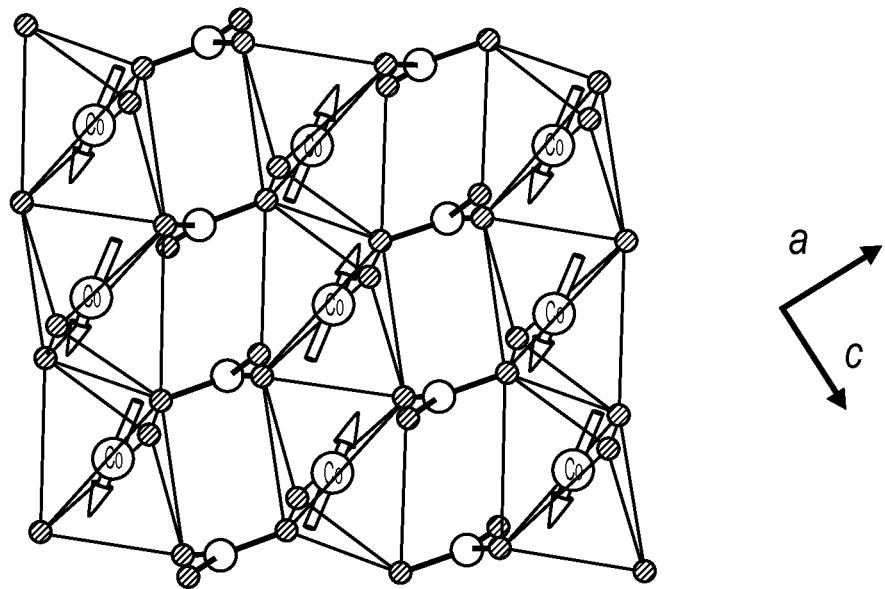
Figure 2D:
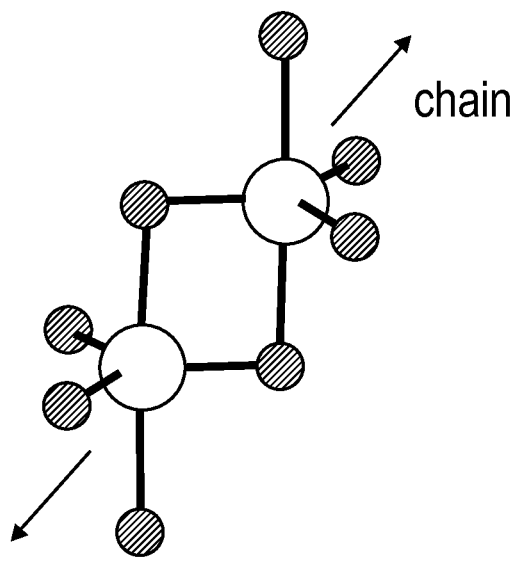
FIG. 2D illustrates a chain of the magnetocaloric material, according to an embodiment.

FIGS. 2A-2C illustrate lattice structures of three materials that may be employed as the magnetocaloric material 102, according to three embodiments. The quasi-dimensional nature of the illustrated lattices of $LiMnBO_3$ (FIG. 2A), $LiFeBO_3$ (FIG. 2B), and $LiCoBO_3$ (FIG. 2C) yields an energy scale where the magnetic-field induced transition temperature is approximately that of the boiling temperature of helium, which may be the cold side refrigerant of the system 100. This is because there is strong ferromagnetic coupling along the chain direction a, as shown in FIG. 2D, and weak antiferromagnetic coupling between chains in direction c. There is also a strong single-ion anisotropy, which provides a competing interaction that can kinetically stabilize any intermediate phases.

Figure 3:
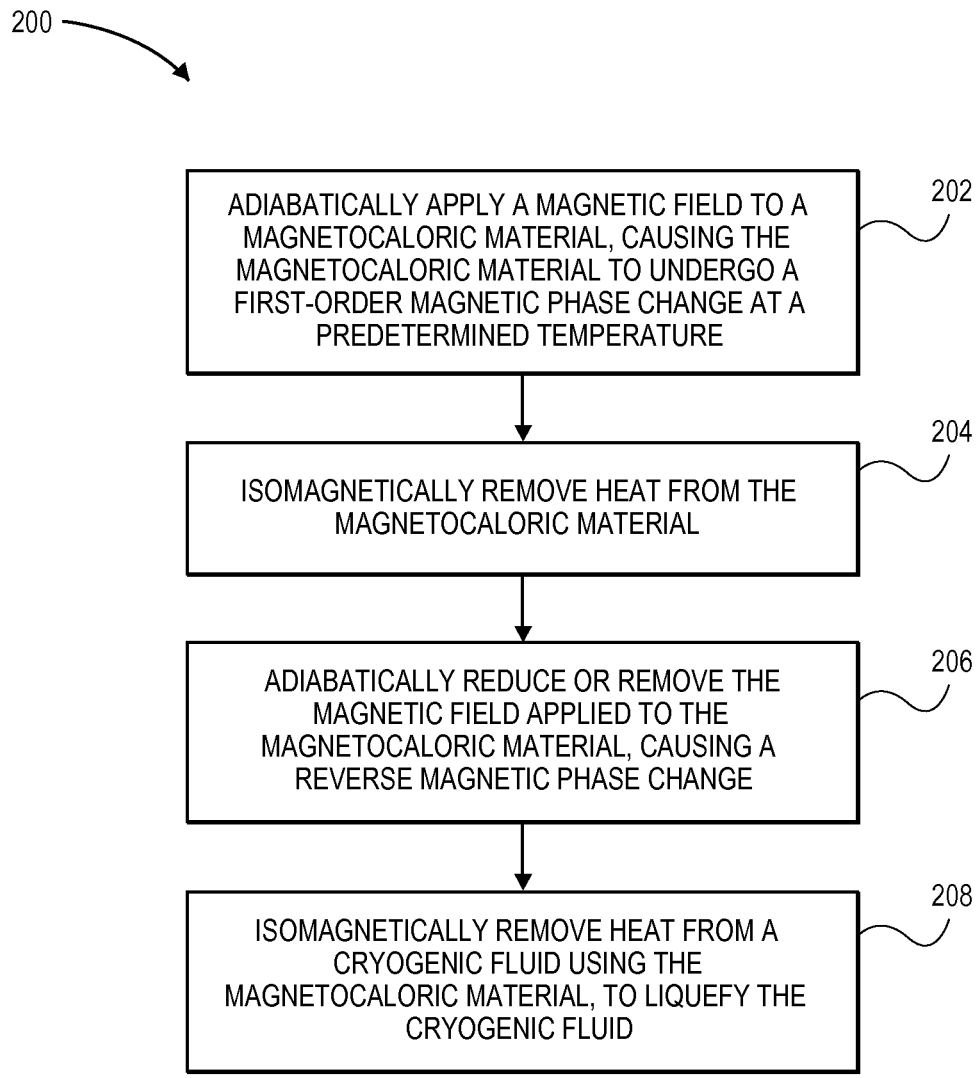
FIG. 3 illustrates a flowchart of a method for cryogenic, magnetocaloric cooling, according to an embodiment.

With continuing reference to FIG. 1, FIG. 3 illustrates a flowchart of a method 200 for cryogenic magnetocaloric refrigeration, according to an embodiment. The method 200 may begin with applying a magnetic field to a magnetocaloric material 102, as at 202, for example, using the magnet 104. The magnetocaloric material 102 may be at a temperature of less than about 24K. The magnetic field applied by the magnet 104 may decrease the entropy of magnetocaloric material 102, resulting in an adiabatic temperature increase of the magnetocaloric material 102 and, for example, causing the magnetocaloric material 102 to undergo a magnetic phase change. The magnetic phase change may be a first-order phase change, for example, to a stable ferrimagnetic ground state from a metastable antiferromagnetic state, at a predetermined temperature. The predetermined temperature may be approximately the boiling temperature of the cold refrigerant. In one specific example, the predetermined temperature may be approximately the boiling temperature of helium (i.e., about 4K). As noted above, this may be at least partially caused by the magnetocaloric material 102 having a single ion anisotropy and/or a low-dimension magnetic structure. Further, the application of the magnetic field may be adiabatic with respect to the magnetocaloric material 102 and may result in the increase in entropy of the magnetocaloric material.

The method 200 may then proceed to removing heat from the magnetocaloric material 102, as at 204. This may be a substantially isomagnetic process, whereby the magnetic field remains generally constant. For example, in the system 100, the heat may be removed via the hot-side refrigerant in the conduit 112. However, in other embodiments, the system 100 may use two heat exchangers 106, 108 and a single refrigerant, or any one of a variety of other configurations.

With the a portion of the heat of the magnetocaloric material 102 removed, and thus the magnetocaloric material 102 cooled, the method 200 may proceed to reducing or removing the magnetic field applied to the magnetocaloric material 102, as at 206. This decrease in magnetic field strength may increase the entropy of the magnetocaloric material 102, thereby causing a substantially adiabatic reduction in the temperature of the magnetocaloric material 102. This may result in a reverse of the first-order magnetic phase change, thereby increasing the heat pumping capacity of the magnetocaloric material 102 in the system 100. The magnetocaloric material 102 is then placed in thermal contact with a cryogenic fluid (e.g., the cold-side refrigerant), such that heat is transferred from the cold-side refrigerant to the magnetocaloric material 102, as at 210.

With the magnetocaloric material 102 composition of the present disclosure, the cold-side refrigerant may be a cryogenic fluid, for example, helium, and operation of the system 100 and/or method 200 may result in the magnetocaloric material 102 condensing the cryogenic fluid by operation at or below the boiling point thereof. Such operation may be cyclic, with the heat transferred from the cold-side refrigerant to the magnetocaloric material being rejected into the hot-side refrigerant by restarting the cycle at 202.

Accordingly, it will be appreciated that magnetocaloric materials 102 having low-dimensional magnetic structures and single ion anistropy may yield maximum entropy change, and thus maximum efficacy, in a heat pump context at the desired temperature, such as near the boiling point of the cold refrigerant in the system 100. The matching of the maximum entropy change point and the boiling point of the fluid may allow magnetic phase transitions in the magnetocaloric material 102 to efficiently condense the gaseous cold refrigerant, thereby forming a liquefied cold refrigerant.

While the present teachings have been illustrated with respect to one or more implementations, alterations and/or modifications may be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A cryogenic magnetocaloric refrigeration system, comprising:
   a cryogenic fluid; and
   a magnetocaloric material comprising a single ion anisotropy and magnetic interactions of at most two dimensions at the boiling temperature of the cryogenic fluid;
   wherein the cryogenic fluid is in communication with the magnetocaloric material, such that, when a magnetic field having a strength of at least a predetermined threshold is applied, the magnetocaloric material at least partially liquefies the cryogenic fluid;
   wherein the magnetocaloric material comprises LiFeBO3, LiMnBO3, LiCoBO3, or a combination thereof.

2. The system of claim 1, further comprising a magnet in communication with the magnetocaloric material and configured to provide the magnetic field acting thereon.

3. The system of claim 2, wherein the predetermined threshold is between about 5 Tesla and about 9 Tesla.

4. The system of claim 1, wherein the magnetocaloric material comprises a transition metal.

5. The system of claim 4, wherein the transition metal is selected from a group consisting of Fe in a trigonal bipyramid crystal field, Co in an octahedral crystal field, and Mn.

6. The system of claim 4, wherein the magnetocaloric material comprises a non-magnetic main-group element.

7. The system of claim 6, wherein the magnetocaloric material comprises an alkali metal.

8. The system of claim 7, wherein the non-magnetic main-group element comprises boron.

9. The system of claim 1, wherein the magnetocaloric material undergoes a magnetic field-induced phase transition at a temperature of about 4 Kelvin and the cryogenic fluid comprises helium.

10. The system of claim 9, wherein the magnetic field-induced phase transition is first order.

11. The system of claim 1, wherein the magnetocaloric material comprises a transition metal, and wherein the transition metal comprises Fe in a trigonal bipyramid crystal field, Co in an octahedral crystal field, or combinations thereof.

12. The system of claim 11, wherein the magnetocaloric material comprises $LiFeBO_3$, $LiCoBO_3$, or a combination thereof.

13. The system of claim 11, wherein the transition metal further comprises Mn.

14. The system of claim 13, wherein the magnetocaloric material comprises $LiMnBO_3$ and further comprises $LiFeBO_3$, $LiCoBO_3$, or a combination thereof.

* * * * *